United States Patent [19]

Harashima et al.

[11] Patent Number: 5,035,599
[45] Date of Patent: Jul. 30, 1991

[54] COMBINED INJECTION-MOLDING AND PRESSING MACHINE

[75] Inventors: Noboru Harashima, Fujisawa; Kazuhiro Mimura, Hiratsuka; Yosuke Sasaki, Zama; Hideaki Okubo, Hiratsuka; Makoto Nogawa, Hiratsuka; Satoshi Fujimoto, Hiratsuka, all of Japan

[73] Assignee: Kabushiki Kaisha Komatsu Seisakusho, Japan

[21] Appl. No.: 474,111

[22] PCT Filed: Aug. 23, 1989

[86] PCT. No.: PCT JP89/000860

§ 371 Date: Apr. 9, 1990

§ 102(e) Date: Apr. 9, 1990

[87] PCT Pub. No.: WO90/02032

PCT Pub. Date: Mar. 8, 1990

[30] Foreign Application Priority Data

Aug. 31, 1988 [JP] Japan .................. 63-115510
Sep. 29, 1988 [JP] Japan .................. 63-245663

[51] Int. Cl.⁵ ............................................ B29C 45/80
[52] U.S. Cl. ..................................... 425/150; 264/40.5; 425/169; 425/171; 425/562; 425/569; 425/589
[58] Field of Search .............. 425/145, 149, 150, 169, 425/171, 562, 567, 569, 574, 589, 562; 264/40.1, 40.5

[56] References Cited

U.S. PATENT DOCUMENTS

4,332,544  6/1982  Aoki .................................. 425/574
4,902,220  2/1990  Nakagawa ........................ 425/574

FOREIGN PATENT DOCUMENTS

5066558  6/1975  Japan .
6122917  1/1986  Japan .
61-186412 11/1986 Japan .
61-186413 11/1986 Japan .
6283119  4/1987  Japan .

Primary Examiner—Timothy Heitbrink
Attorney, Agent, or Firm—Richards, Medlock & Andrews

[57] ABSTRACT

In a combined injection-molding and pressing machine according to the present invention, an injector (10a) of horizontal injection apparatus (10) is disposed below a stationary die plate (2) of a vertical press (1), an injection nozzle (10b) of the injector (10a) is formed into an L-shaped, and the injection nozzle includes a valve (10c) for opening and closing a resin passsage. Corresponding to extension and contraction of the horizontal injection apparatus (10), a base (14) of a platform (4) mounting thereon the horizontal injection apparatus (10) is allowed to slide about the injection nozzle (10), and the L-shaped injection nozzle (10b) is caused to contact with a lower mold (3) at a predetermined surface pressure. Therefore, color changing and purging of resin is more efficient and complete. No need of a hot runner permits to employ an inexpensive and versatile mold that is more widely used in common. Since resin is surely loaded through the short resin passage, molding with stable quality can be produced. Even when the horizontal injection apparatus (10) extends and contracts, the lower mold (3) remains immobile and no resin is leaked. Further, the injector (10a) can be moved outwardly away from a position below the stationary die plate (2), which facilitates replacement and/or inspection of the injection nozzle (10b), a screw and so forth.

18 Claims, 6 Drawing Sheets

COMBINED INJECTION-MOLDING AND PRESSING MACHINE

TECHNICAL FIELD

The present invention relates to a combined injection-molding and pressing machine constituted by combining an injection apparatus with a press, and more particularly to a combined injection-molding and pressing machine which is improved in a support structure for an injection apparatus and a coupling structure of the injection apparatus with a press.

BACKGROUND OF THE INVENTION

Figure 1:
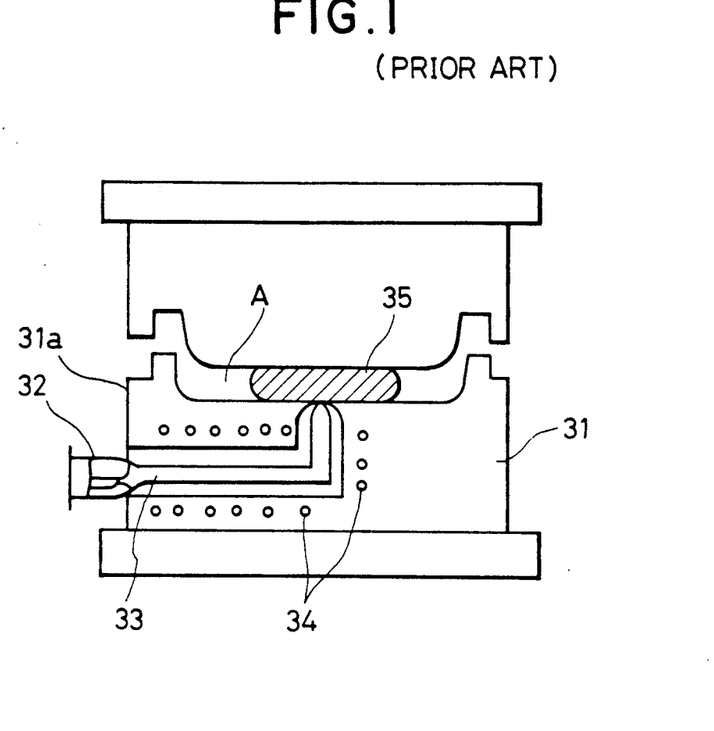
FIGS. 1 and 2 are front views of a mold section in the prior arts.
Figure 2:
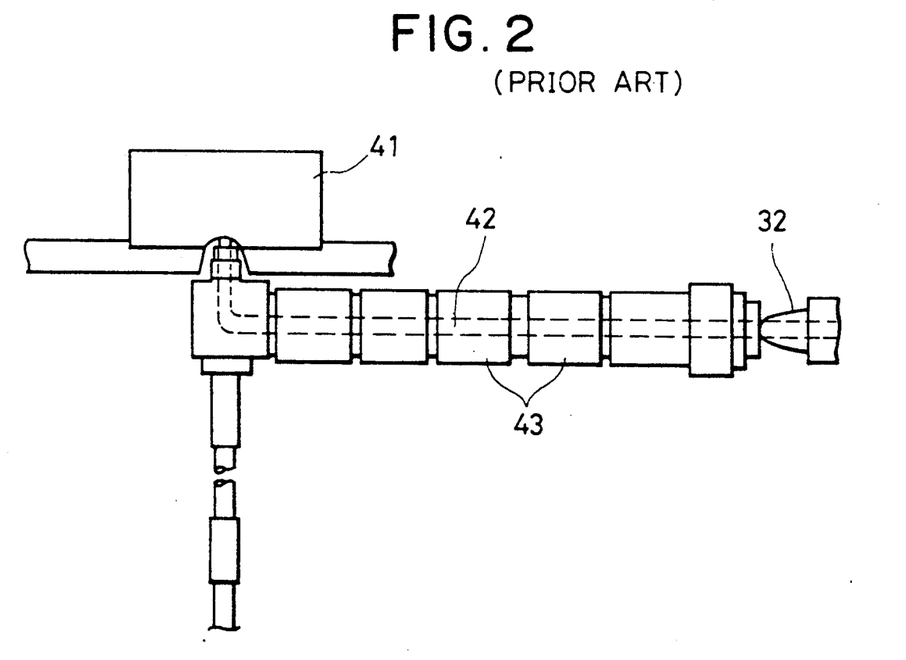

Conventional combined injection-molding and pressing machines include a combination of a horizontal press and a vertical injection apparatus, and a combination of a vertical press and a horizontal injection apparatus. However, the former combination usually has such problems that the overall height of a combined machine is increased when installed, and that working efficiency is low at replacement of a screw. Therefore, the latter combination has a major widespread use in the field. For example, there is known a machine of the latter combination in which, as shown in FIG. 1 depicting a mold front view, an injection nozzle 32 is abutted or contacted with a side face 31a of a lower mold 31 on the stationary side, a hot runner 33 is machined in the lower mold 31 to extend from the contact portion thereof with the injection nozzle 32, and a heater 34 is disposed around the hot runner, for thereby injecting resin 35 into a cavity A through the hot runner (Japanese Patent Laid-Open No. 61(1986)-22917). As shown in FIG. 2 depicting a mold front view, there is also known a machine in which a hot runner is separated from a lower mold 41. Thus, a long hot runner 42 is provided to be contacted at one end with a gate of the mold 41 and at the other end with an injection nozzle 32, and heater rings 43 are disposed to cover the hot runner 42 (Japanese Patent Laid-Open No. 50(1975)-66558). These machines have made improvements in the contact point of the injection apparatus with the press and in reducing the amount of resin loss. In spite of such improvements, the conventional combined injection-molding and pressing machines constituted by combining a vertical press with a horizontal injection apparatus are still problematic. In the machine of FIG. 1, the injection apparatus is forced to extend and contract by heat. More specifically, when the injection nozzle 32 extends, the lower mold 31 is pushed to move correspondingly. When the injection nozzle 32 contracts reversely, the contact surface pressure between the injection nozzle 32 and the lower mold 31 is so reduced that the resin 35 may leak therethrough. Another problem is in that this type lower mold 31 requires the higher manufacture cost and cannot be replaced by such molds as employed in usual injection molding for common use. Still another problem is in that color changing of the resin 35 is inefficient and incomplete with the presence of the hot runner 33.

Meanwhile, in the machine of FIG. 2, as the injection nozzle 32 and the hot runner 42 extend and contract by heat, there occur shifts in the contact position between the injection nozzle 32 and the hot runner 42 and the contact position between the hot runner 42 and the lower mold 41. Another problem is that because of a long passage from the injection nozzle 32 to the lower mold 41 through the hot runner 42, color changing and purging (i.e., operation to remove dirt in the passage by running the machine while passing certain resin previously prepared at the time of color changing) of the resin are inefficient and incomplete, and quality of the products is degraded.

Furthermore, the machines of FIGS. 1 and 2 are both problematic in point of needing a large installation space. Such a problem can be coped with by providing a horizontal injection apparatus below a die plate of a vertical press. But, this arrangement gives rise to a new different problem of difficulties in replacement and/or inspection of a nozzle, a screw and the like of the injection apparatus.

In view of the state of the art as mentioned above, an object of the present invention is to provide a combined injection-molding and pressing machine with a combination of a vertical press and a horizontal injection apparatus, which is more efficient and complete in both color changing and purging of resin, which can offer an inexpensive and versatile mold that is more widely used in common, and moldings with stable quality, which can prevent a shift of the contact position between an injection nozzle and a mold even when the injection apparatus extends and contracts by heat, and which can facilitate replacement and/or inspection of a nozzle, a screw and the like of the injection apparatus.

SUMMARY OF THE INVENTION

A combined injection-molding and pressing machine according to the present invention resides in a forming machine comprising a vertical press for opening and closing molds and a horizontal injection apparatus for supplying molten resin into a cavity between the molds, wherein an injector of the horizontal injection apparatus is disposed below a stationary die plate of the vertical press, an injection nozzle of the injector is formed into an L-shape, and the injection nozzle includes a valve for opening and closing a resin passage. Corresponding to extension and contraction of the horizontal injection apparatus, a base of a platform mounting thereon the horizontal injection apparatus is allowed to slide about the injection nozzle, and the L-shaped injection nozzle is caused to contact with a lower mold at a predetermined surface pressure. The present machine further, comprises means for detecting a temperature of the horizontal injection apparatus; means for detecting a position of the horizontal injection apparatus shifted dependent on the temperature; arithmetic control means for executing arithmetic operation based on an output signal from the temperature detecting means or the position detecting means, and controlling the movement of the horizontal injection apparatus; and moving means for moving the horizontal injection apparatus in accordance with a signal from the arithmetic control means.

With the above constitution, since the resin passage becomes short and resin is surely loaded into the cavity, color changing and purging of the resin is more efficient and complete. No need of a hot runner permits to employ an inexpensive and versatile mold that is more widely used in common. Even when the horizontal injection apparatus extends and contracts by heat, the base of the platform mounting thereon the horizontal injection apparatus is allowed to slide so that there occurs no shift in a mutual positional relationship between the injection nozzle and the lower mold. Therefore, even when the horizontal injection apparatus extends, the lower mold remains immobile and even when it contracts, any leakage of the resin is prevented. Further, since the L-shaped injection nozzle is controlled by the actuator or the like such that it is contacted with the lower mold at the predetermined surface pressure, the lower mold is held fixed and no resin is leaked regardless of extension and contraction due to heat or an injection pressure of the resin. In addition, the injector can be moved outwardly away from a position below the stationary die plate, which facilitates replacement and/or inspection of the injection nozzle, a screw and so forth of the injector.

DETAILED DESCRIPTION

Figure 3:
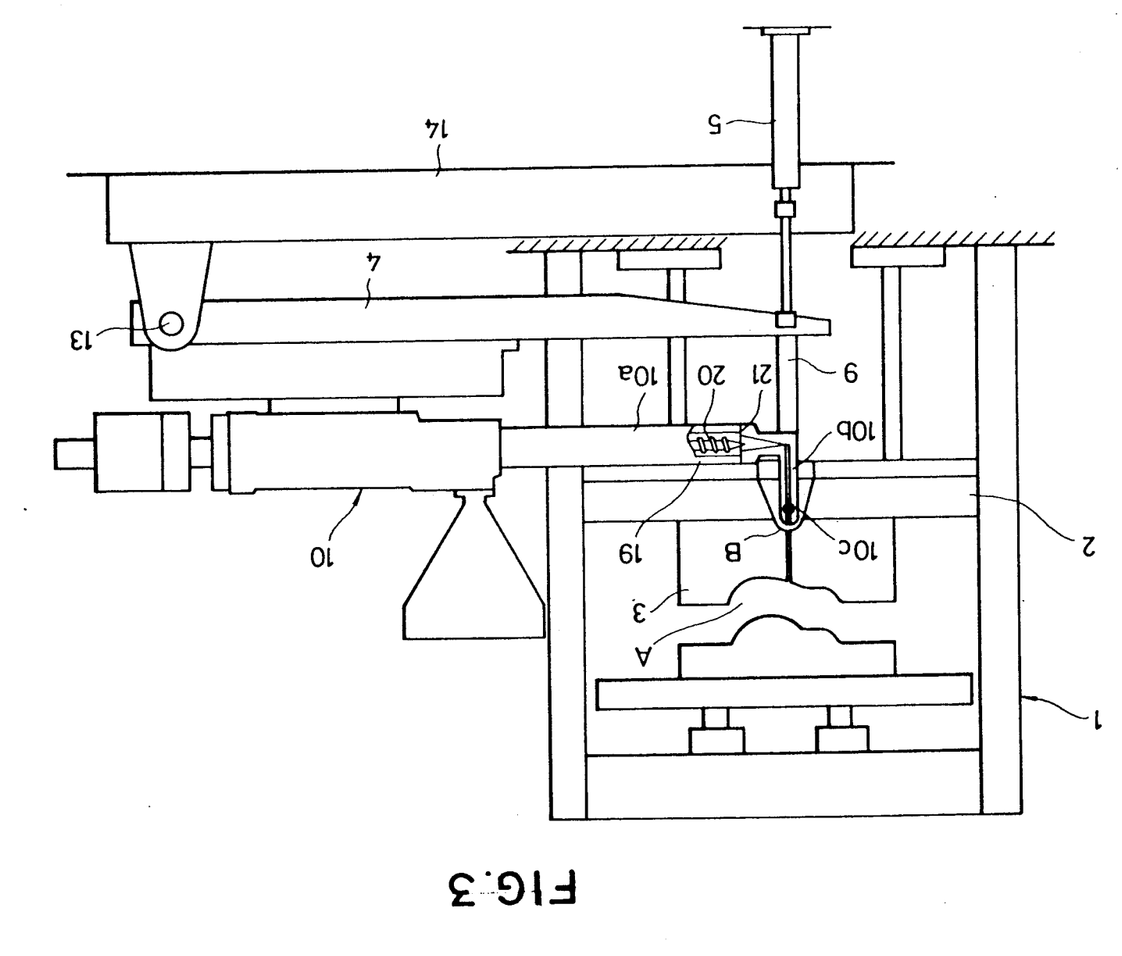
FIG. 3 is a schematic view of overall constitution according to a first embodiment of the present invention.

FIG. 3 is a schematic view of overall constitution according to a first embodiment of the present invention. A lower mold 3 is mounted on a stationary die plate 2 of a compression forming machine 1, and an injector 10a of a horizontal injection apparatus 10 is disposed below the die plate 2. An L-shaped injection nozzle 10b of the injector 10a is pushed upwardly by a rod 9 and an actuator 5 which is able to extend and contract vertically, so that the injection nozzle 10b is positively abutted or contacted with the underside of the lower mold 3. The injection nozzle 10b includes a resin passage opening/closing valve 10c which is operated by a servo motor (not shown) in a manner to open when resin is loaded and to close when resin is compressed. The actuator 5 is operated by a pressure supplied from a pressure source (not shown) to push up the injection nozzle 10b against the underside of the lower mold 3, while turning a platform 4 mounting thereon the horizontal injection apparatus 10 about a pin 13. The platform 4 is supported by the pin 13 in turn fixedly provided on a base 14. The horizontal injection apparatus 10 includes the injector 10a comprising an injection cylinder 19, a screw 20 and so forth. The injection nozzle 10b is attached to a distal end 21 of the injection cylinder 19 in a detachable manner.

In this embodiment thus constituted, when resin is loaded or filled into the cavity A of the lower mold 3, a hydraulic fluid is supplied to the actuator 5 to extend it so that the injection nozzle 10b is pushed against the underside of the lower mold 3 at a contact position B. The servo motor is then operated to open the resin passage opening/closing valve 10c while the screw 20 is advanced to thereby inject the resin. A hot runner, is not required because of a short distance between the cavity A and the contact position B. Also, since a resin passage from the screw 20 to the lower, mold 3 is short, the resin is less subjected to flow resistance and can be loaded under a lower pressure. The positive sealing at the contact position B between the injection nozzle 10b and the underside of the lower mold 3 prevents the resin from leaking and hence being wasted. When another kind of moldings is to be produced after the current molding cycle, the hydraulic fluid is supplied to the actuator 5 to now contract it, and the injection nozzle 10b is departed away from the contact position B with the underside of the lower mold 3, followed by replacing the mold with new one. The short distance between the lower mold 3 and the cavity A contributes to improve efficiency and completeness of color changing and purging of the resin. In addition, since the mold does not need a hot runner, it is possible to employ an inexpensive and versatile mold that is more widely used in common. Although the platform 4 is turned about the pin 13 in this embodiment, it may be moved vertically in parallel relation to the stationary die plate 2.

Figure 4:
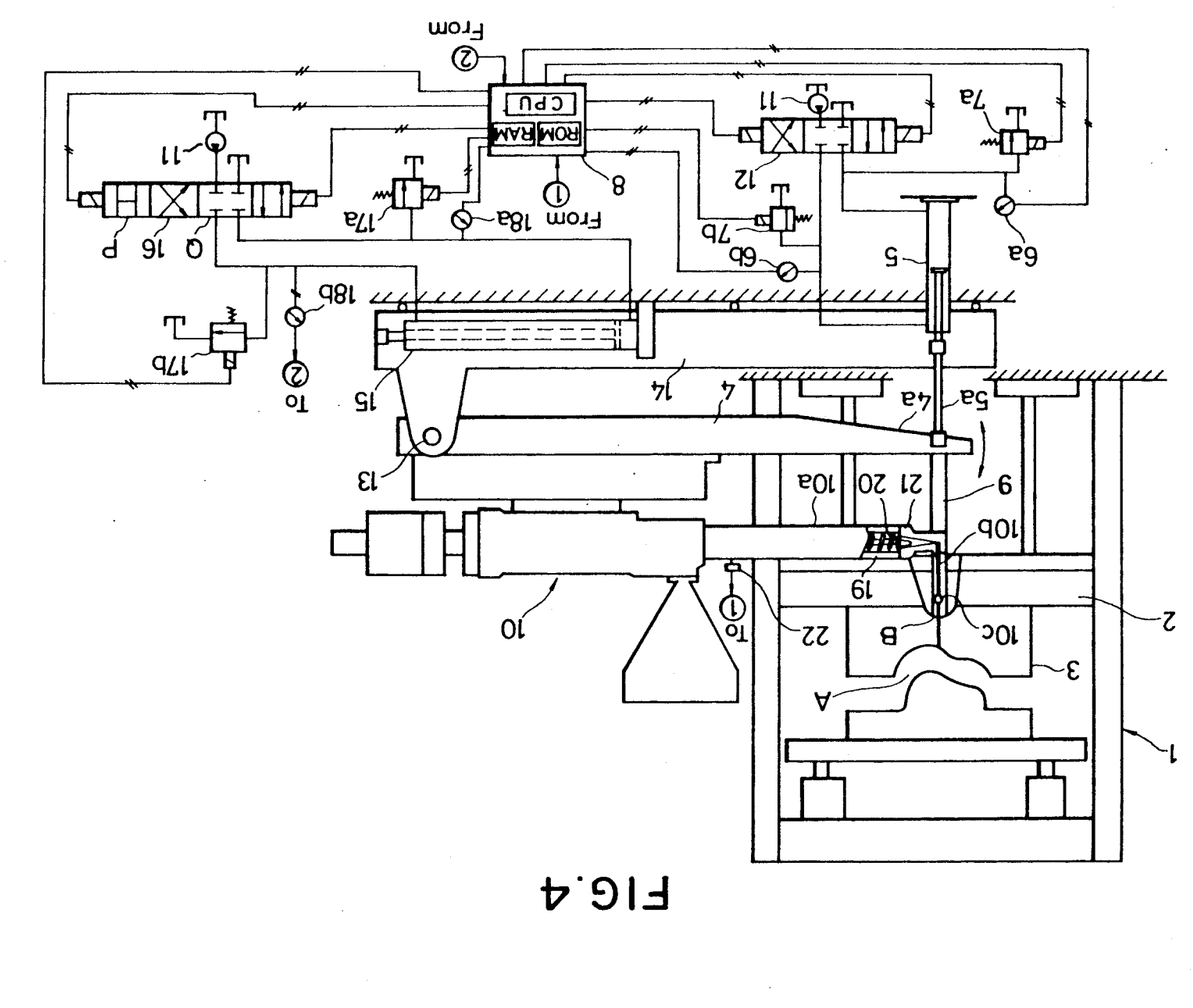
FIG. 4 is a schematic view of overall constitution according to a second embodiment of the present invention.
Figure 5:
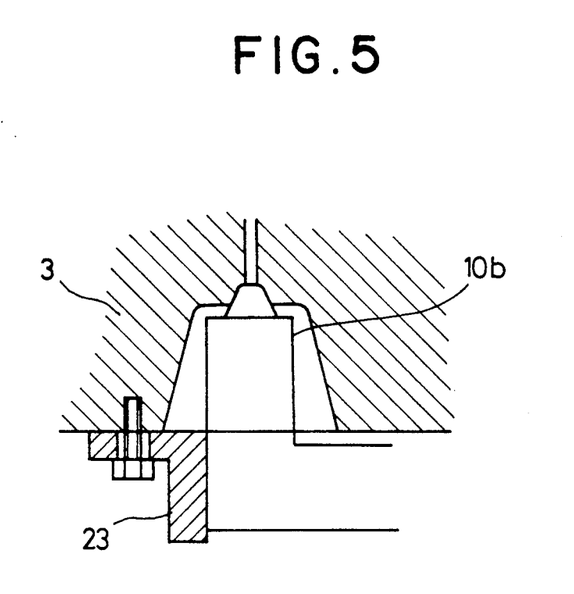
FIG. 5 is an explanatory view for fixing of an injection nozzle according to the second embodiment of the present invention.

FIG. 4 is a schematic view of overall constitution according to a second embodiment of the present invention. The same parts as those in the first embodiment are designated by the same reference numerals and their explanation is omitted here. An L-shaped injection nozzle 10b of an injector 10a is pushed upwardly by a rod 9 and an actuator 5 which is able to extend and contract vertically, so that the injection nozzle 10b is positively abutted or contacted with the underside of a lower mold 3. At this time, in order to ensure the contact at a predetermined surface pressure, hydraulic pressures of the actuator 5 are detected by pressure gauges 6a, 6b and relief set pressures of pressure regulating valves 7a, 7b are controlled by a controller 8 to maintain those hydraulic pressures at predetermined levels. On the other hand, the injection nozzle 10b includes a resin passage opening/closing valve 10c which is operated by a servo motor (not shown) in a manner to open when resin is loaded and to close when resin is compressed. The injection nozzle 10b and a platform 4 is coupled to each other by the rod 9. Also, after the injection nozzle 10b has been contacted with the lower mold 3, a block 23 is abutted with the injection nozzle 10b for fixing it in place, as shown in FIG. 5, the block 23 being adjustable in its mount position through an elongate hole or the like. The actuator 5 is operated by a pressure supplied from a pressure source 11 through switching of a selector valve 12 to move rod 9 upwardly to push the injection nozzle 10b against the underside of the lower mold 3 at the predetermined pressure, while pivoting the platform 4 about a pin 13. The platform 4 is supported by the pin 13, which in turn is fixedly provided on a base 14, and mounts thereon a horizontal injection apparatus 10. An actuator 15 capable of extending and contacting horizontally is coupled to the base 14, so that the base 14 is allowed to slide upon the actuator 15 receiving a hydraulic fluid supplied from the pressure source 11 through a selector valve 16. Between the selector valve 16 and the actuator 15, there are provided pressure regulating valves 17a, 17b controlled by the controller 8 and pressure gauges 18a, 18b for sending pressure signals to the controller 8. The horizontal injection apparatus 10 includes the injector 10a comprising a temperature sensor 22, an injection cylinder 19, a screw 20 and so forth. The injection nozzle 10b is attached to a distal end 21 of the injection cylinder 19 in a detachable manner. Thus, the injection nozzle 10b can be removed from the injection cylinder, 19 for replacement and/or inspection of the screw 20.

Figure 6:
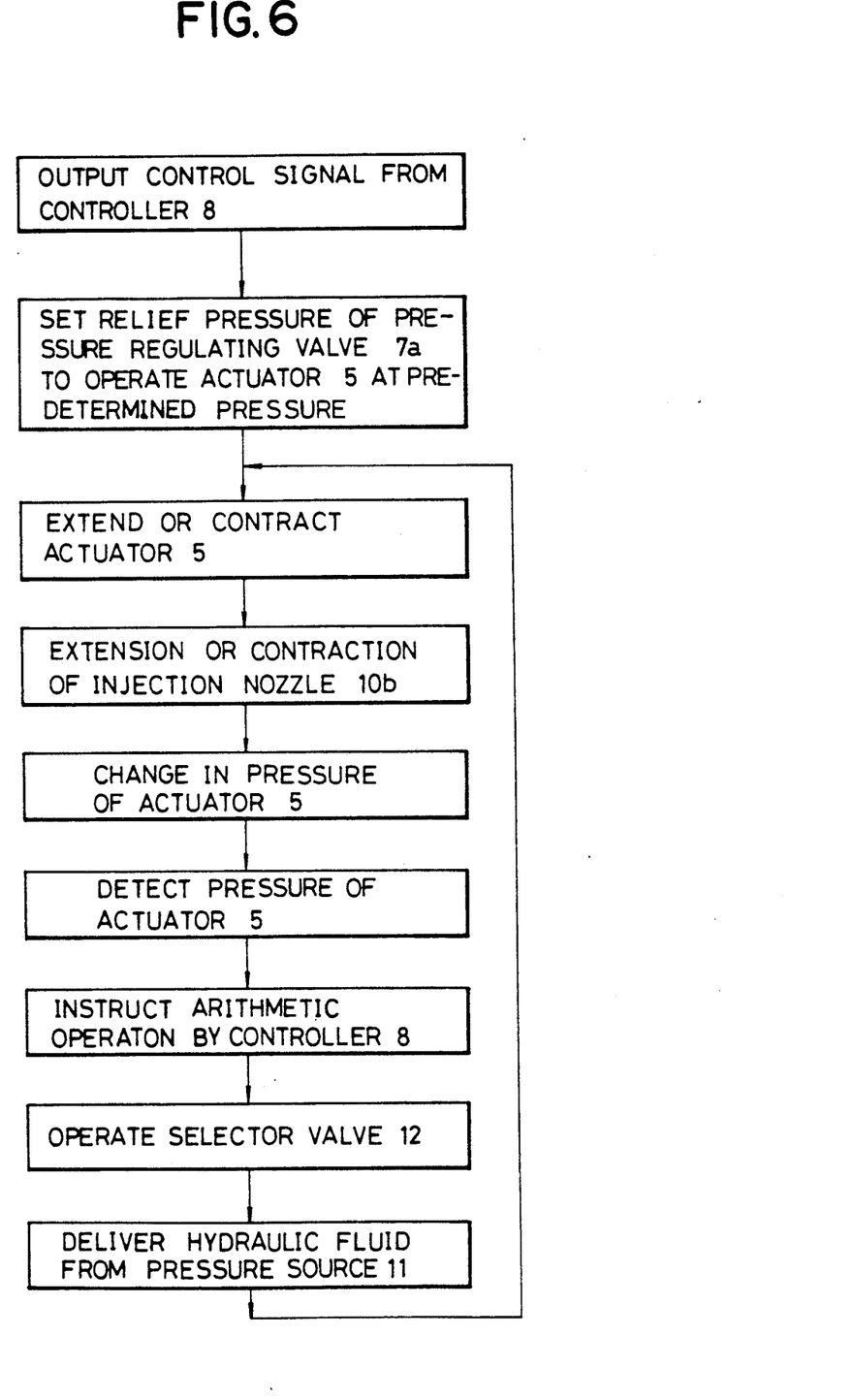
FIG. 6 is a flowchart for control of an actuator, which is able to extend and contract vertically, according to the second embodiment of the present invention.

In this embodiment thus constituted, when resin is loaded or filled into the cavity A of the lower mold 3, as shown in a flowchart of FIG. 6, a control signal is first output from the controller 8 to the pressure regulating valve 7a to supply the hydraulic fluid under a predetermined pressure to actuator 5 for extending it. The servo motor (not shown) is then operated to open the resin passage opening/closing valve 10c, while the screw 20 is advanced to thereby inject the resin. As the hot molten resin flows through a resin passage in the injection nozzle 10b, the injection nozzle 10b is extended so that it tries to push the lower mold 3 upwardly. But, since the lower mold 3 is fixedly mounted on the stationary die plate 2, a rod 5a of the actuator 5 is pushed downwardly. At this time, the pressure of the actuator 5 is regulated by the pressure regulating valve 7a to hold a predetermined level. When the temperature of the injection nozzle 10b is lowered, the injection nozzle 10b is contracted and hence the pressure of the actuator 5 is caused to drop down below the predetermined level. The dropped pressure is detected by the pressure gauge 6a and fed back to the controller 8 which in turn outputs a signal to operate the selector valve 12, whereby the hydraulic fluid is delivered from the pressure source 11 to control the pressure of the actuator 5 to remain at the predetermined level. On this occasion, since the contact point between the injection nozzle 10b and the underside of the lower mold 3 is positively sealed, the resin is surely loaded into the cavity A without leaking through that contact point. During the loading step of the resin, while the horizontal injection apparatus 10 is extended by heat, this extension causes the platform 4 and the base 14 to slide rightwardly away from the injection nozzle 10b which is held fixed in place. At this time, the selector valve 16 is switched to a position P so that the base 14 is held not fixed, but in a free state. Also, when the resin is injected and loaded into the cavity with the selector valve 16 switched to a position Q, it is possible to calculate a shift amount of the injection apparatus 10 by the controller 8 in accordance with a signal from the temperature sensor 22, and to switch the selector valve 16 dependent on the calculated shift amount for delivering the hydraulic fluid to the actuator 15, so that the platform 4 and the base 14 are allowed to slide from a reference point corresponding to the temperature initially set. Alternatively, the actuator 15 may be controlled by detecting the pressures thereof, as with the actuator 5. When producing another kind of moldings, or when replacing and/or inspecting the injection nozzle 10b, the screw 20 and so forth, the hydraulic fluid is supplied to the actuator 5 to now lower the rod 5a, thereby pivoting the platform 4 such that its underside 4a comes into contact with the base 14. When the rod 5a is departed away from the platform 4 by further lowering the rod 5a, the hydraulic fluid is supplied to the actuator, 15 to slide the base 14 rightwardly, whereby the injector 10a of the horizontal injection apparatus 10 is moved outwardly away from a position below the die plate 2. As a result, the replacement and/or inspection work for the injection nozzle 10b, the screw 20 and so forth can be facilitated.

Figure 7:
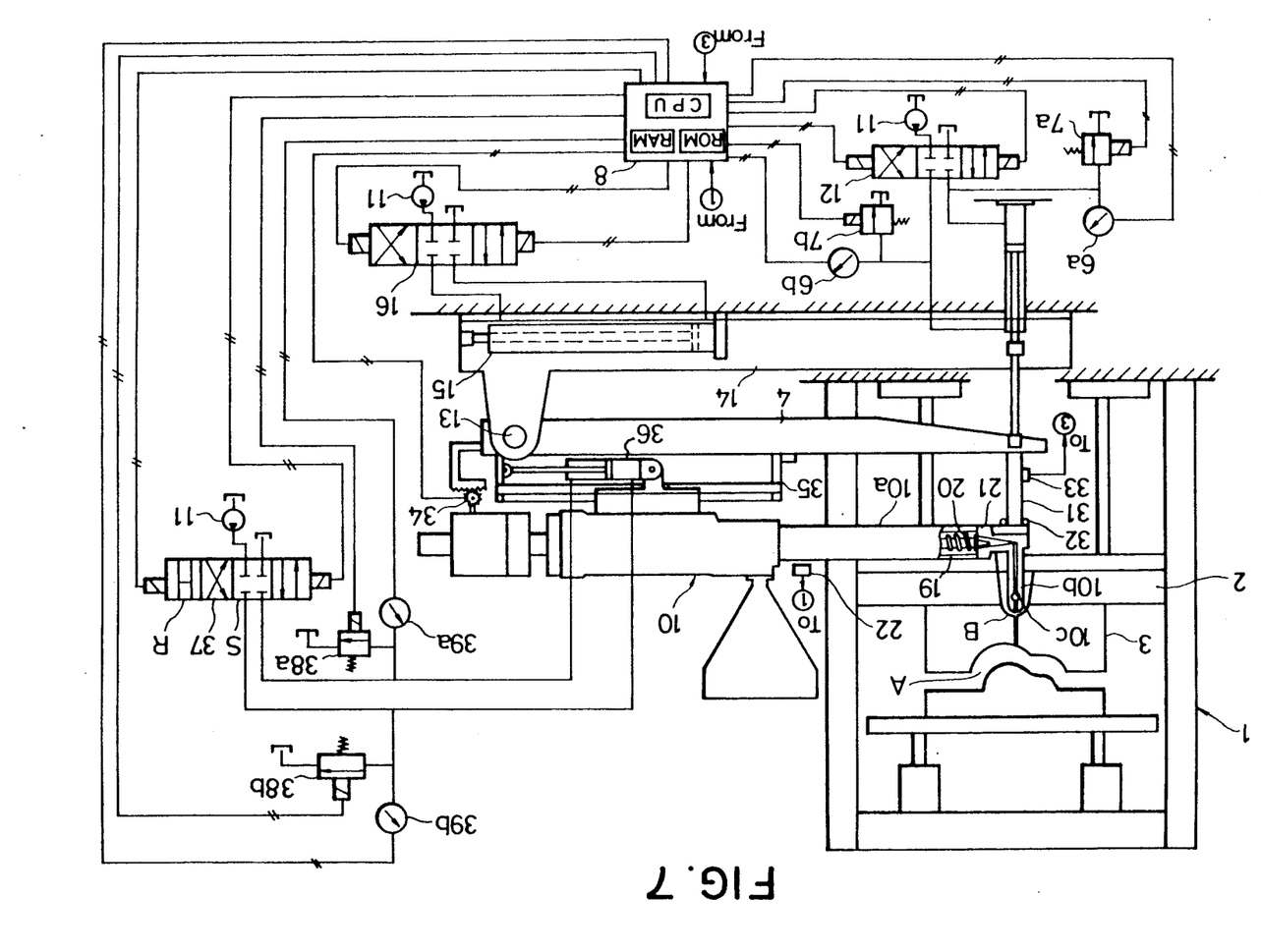
FIG. 7 is a schematic view of overall constitution according to a third embodiment of the present invention.

FIG. 7 is a schematic view of overall constitution according to a third embodiment of the present invention. The same parts as those in the second embodiment are designated by the same reference numerals and their, explanation is omitted here. A rod 31 has one end fixed to a platform 4 and the other end fastened to an injection nozzle 10b by means of bolts 32. A stress measuring gauge 33 is attached to an intermediate portion of the rod 31 in order to control a contact surface pressure between the injection nozzle 10b and a lower mold 3. The position of the injection nozzle 10b relative to the lower mold 3 is determined by the platform 4 which is turned about a pin 13. Length changes of a horizontal injection apparatus 10 in the longitudinal direction thereof are detected by a position sensor 34 attached to one end of the horizontal injection apparatus 10, and fed back to a controller 8. An injector 10a is fitted to a groove formed in the sub-platform 35 in a manner to slide along the groove, and also coupled to a sub-actuator 36 associated with the sub-platform 35. The sub-actuator 36 is connected to a pressure source 11 through a selector valve 37, so that a hydraulic fluid is supplied to the sub-actuator 36 upon the selector valve 37 being operated in response to an instruction from a controller 8. Between the sub-actuator 36 and the selector valve 37, there are provided pressure regulating valves 38a, 38b controlled by the controller 8 and pressure gauges 39a, 39b for sending pressure signals to the controller 8.

Figure 8:
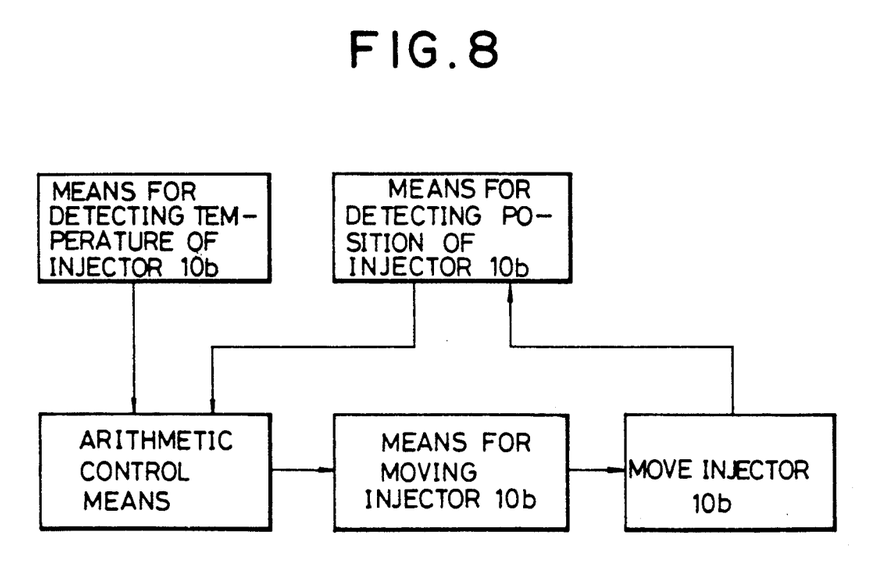
FIG. 8 is a block diagram for control of an actuator, which is able to extend and contract horizontally, according to the third embodiment of the present invention.

In this embodiment thus constituted, when resin is loaded or filled into a cavity A of the lower mold 3, the horizontal injection apparatus 10 becomes high temperature to extend in itself. But, the injector 10a is allowed to slide rightwardly with the injection nozzle 10b held fixed in place. With the selector valve 37 shifted to a position R, the injector 10a remains in a free state relative to the sub-platform 35. Then, while the resin is being loaded into the cavity A, the selector valve 37 is shifted to a position S, making the injector 10a fixed relative to the sub-platform 35. During this process, as the temperature of the injector 10a is varied to extend and contract, the pressure regulating valve 38a on one side of the sub-actuator 36 is operated to slide the injector 10a in the same direction as one side relative to the other side. Simultaneously, the shift in position of the injector 10a due to extension and contraction thereof is detected by the position sensor 34, and the hydraulic fluid is supplied to the other side of the sub-actuator 36 in an amount dependent on the detected shift. Means for carrying out the above control comprises, as shown in a block diagram of FIG. 8, temperature detecting means such as a temperature sensor 22 adapted to detect a temperature of the injector 10a of the horizontal injection apparatus 10; position detecting means such as the position sensor 34 adapted to detect a shift in position of the horizontal injection apparatus 10 dependent on the temperature; arithmetic control means such as the controller 8 adapted to receive a detection signal for a shift amount of the injector 10a output from the temperature detecting means or the position detecting means, and execute arithmetic operation based on the detection signal to output a control signal; and moving means such as the sub-actuator 36 adapted to move the injector 10a in accordance with the control signal. Accordingly, even when the temperature of the injector 10a is varied to extend and contract, there will never occur any shift or offset between the injection nozzle 10b and the lower mold 3. Although the platform 4 is turned about the pin 13 in this embodiment, it may be moved vertically in parallel relation to the stationary die plate 2. Further, although the platform 4 and the sub-platform 35 are respectively moved by the actuator, 5 and the sub-actuator 36 dependent on the movement of the horizontal injection apparatus 10, these platforms may be moved using a ball screw or the like.

As described above, the combined injection-molding and pressing machine according to the present invention has a lower height and can take a larger area of the stationary die plate as compared with the prior art machines, and hence it is useful as a forming machine of relatively large size. The present machine is also useful as a forming machine which can easily replace and/or inspect the injection nozzle, the screw and so forth, which has excellent efficiency and completeness in color changing and purging of resin, which can employ an inexpensive and versatile mold that is more widely used in common, and which can provide moldings with stable quality. In particular, since there will never occur any shift in a positional relationship between the injection nozzle and the mold, the present machine is further useful as a forming machine which causes no leakage of the resin and less wear at the mutual contact point therebetween.

We claim:

1. A combined injection-molding and pressing machine comprising:
    a vertical press adapted for opening and closing of an upper mold and a lower mold, with the lower mold having an underside and a resin inlet in said underside, said vertical press having a stationary horizontal die plate adapted to support said lower mold thereon;
    a horizontal injection apparatus including an L-shaped injection nozzle having an outlet, a resin passageway through said nozzle to said outlet, and a valve for opening and closing said resin passageway, said injection apparatus being adapted for injection of molten resin through said nozzle, a platform, said injection apparatus being carried by said platform so that the outlet of said injection nozzle can be moved into and out of positive abutment with a resin inlet in the underside of said lower mold with said injection nozzle exerting contact pressure against the underside of said lower mold during such abutment when said lower mold is supported on said die plate;
    a base movable horizontally toward and away from said vertical press, a first hydraulic actuator for moving said base horizontally toward said vertical press so as to position said injection nozzle under said die plate and for moving said base horizontally away from said vertical press so as to withdraw said injection nozzle from under said die plate; said platform being movably supported on said base so as to provide for relative vertical motion of said injection nozzle with respect to said base, a second hydraulic actuator, said platform being movable by said second hydraulic actuator so as to move said injection nozzle vertically into and out of positive abutment with the resin inlet in the underside of said lower mold when said lower mold is supported on said die plate and when said injection nozzle is positioned under said die plate by said base;
    a hydraulic circuit which includes said first and second hydraulic actuators and a pressure source to supply hydraulic fluid under pressure to said first and second hydraulic actuators;
    a first detection means for producing a first output signal which is responsive to the pressure at which said injection nozzle contacts said lower mold positioned on said die plate; and
    control means for controlling said second hydraulic actuator in response to said first output signal to maintain a predetermined contact pressure between said injection nozzle and said lower mold positioned on said die plate during the injection of molten resin through said nozzle.

2. A machine in accordance with claim 1 wherein said platform has a horizontal pivot axis, a first end and a second end opposite said first end, said first end of said platform being pivotally mounted on said base for rotation of said platform about said horizontal pivot axis, and wherein said second hydraulic actuator causes the second end of said platform opposite said first end to move vertically to thereby rotate said platform about said horizontal pivot axis so as to move said injection nozzle vertically into and out of positive abutment with the resin inlet in the underside of said lower mold when said lower mold is supported on said die plate and said injection nozzle is positioned under said die plate by said base.

3. A machine in accordance with claim 2 wherein said first detection means provides said first output signal in response to the pressure of the hydraulic fluid being supplied to said second hydraulic actuator to cause the positive abutment of said injection nozzle with the resin inlet in the underside of said lower mold supported on said die plate.

4. A machine in accordance with claim 3 wherein said hydraulic circuit further comprises pressure regulating valves which are adjustable by said control means to thereby control the pressure of hydraulic fluid in said second hydraulic actuator.

5. A machine in accordance with claim 2 wherein said injection apparatus has a temperature, and said machine further comprises means for controlling the supply of hydraulic fluid to said first hydraulic actuator so that during the injection of molten resin through said nozzle said base is free to move horizontally to accommodate extending and contracting of said injection apparatus as a result of variations in the temperature of the injection apparatus, thereby preventing any shift between the injection nozzle and said lower mold positioned on said die plate which otherwise results from the extending and contracting of said injection apparatus.

6. A machine in accordance with claim 2 wherein said injection apparatus has a temperature which is detected, and wherein said injection apparatus further comprises a second detection means for producing a second output signal which is responsive to said temperature of said injection apparatus, and means for controlling said first hydraulic actuator responsive to said second output signal to prevent any shift between said injection nozzle and said lower mold as a result of variations in said temperature of said injection apparatus.

7. A machine in accordance with claim 6 wherein said means for controlling said first hydraulic actuator responsive to said second output signal comprises means for controlling the pressure of the hydraulic fluid being supplied to said first hydraulic actuator.

8. A machine in accordance with claim 2 wherein said injection apparatus has a temperature, wherein said injection apparatus has a remote portion which is remote from said injection nozzle, and wherein said machine further comprises means for movably mounting on said platform said remote portion of said injection apparatus so that said remote portion of said injection apparatus is movable horizontally relative to said platform toward and away from said vertical press, a third hydraulic actuator for moving said remote portion of said injection apparatus horizontally toward and away from said vertical press, a second detection means for producing a second output signal in response to said temperature of said injection apparatus, and means for controlling said third hydraulic actuator in response to said second output signal to prevent any shift between said injection nozzle and said lower mold as a result of variations in said temperature of said injection apparatus.

9. A machine in accordance with claim 8 further comprising means for detecting the position, relative to said platform, of said remote portion of said injection apparatus and producing a third output signal representative thereof, and wherein said means for controlling said third hydraulic actuator is responsive to said second output signal and said third output signal to prevent any shift between said injection nozzle and the lower mold as a result of variations in said temperature of said injection apparatus.

10. A machine in accordance with claim 9 further comprising a rod, and wherein said injection nozzle is supported above said second end of said platform by said rod, and wherein said first detection means for producing a first output signal in response to the pressure at which said injection nozzle contacts said lower mold positioned on said die plate comprises a stress measuring gauge mounted on said rod to determine the pressure at which said injection nozzle contacts said lower mold positioned on said die plate and to produce said first output signal in response thereto.

11. A machine in accordance with claim 1 wherein said first detection means provides said first output signal in response to the pressure of the hydraulic fluid being supplied to said second hydraulic actuator to cause the positive abutment of said injection nozzle with the resin inlet in the underside of said lower mold supported on said die plate.

12. A machine in accordance with claim 11 wherein said hydraulic circuit further comprises at least one pressure regulating valve which is adjustable by said control means to thereby control the pressure of hydraulic fluid in said second hydraulic actuator.

13. A machine in accordance with claim 1 wherein said injection apparatus has a temperature, and wherein said machine further comprises means for controlling the supply of hydraulic fluid to said first hydraulic actuator so that during injection of molten resin through said nozzle said base is free to move horizontally to accommodate extending and contracting of said injection apparatus as a result of variations in said temperature of the injection apparatus, thereby minimizing any shift between the injection nozzle and said lower mold positioned on said die plate which otherwise results from the extending and contracting of said injection apparatus.

14. A machine in accordance with claim 1 wherein said injection apparatus has a temperature which is detected, and wherein said injection apparatus further comprises a second detection means for producing a second output signal responsive to said temperature of said injection apparatus, and means for controlling said first hydraulic actuator in response to said second output signal to minimize any shift between said injection nozzle and said lower mold positioned on said die plate as a result of variations in said temperature of said injection apparatus.

15. A machine in accordance with claim 14 wherein said means for controlling said first hydraulic actuator responsive to said second output signal comprises means for controlling the pressure of the hydraulic fluid being supplied to said first hydraulic actuator.

16. A machine in accordance with claim 1 wherein said injection apparatus has a temperature which is detected, wherein said injection apparatus has a remote portion which is remote from said injection nozzle, and wherein said machine further comprises means for movably mounting on said platform said remote portion of said injection apparatus so that said remote portion of said injection apparatus is movable horizontally relative to said platform toward and away from said vertical press, a third hydraulic actuator for moving said remote portion of said injection apparatus horizontally toward and away from said vertical press, a second detection means for producing a second output signal responsive to said temperature of said injection apparatus, and means for controlling said third hydraulic actuator responsive to said second output signal to minimize any shift between said injection nozzle and said lower mold positioned on said die plate as a result of variations in said temperature of said injection apparatus.

17. A machine in accordance with claim 16 further comprising means for detecting the position, relative to said platform, of said remote portion of said injection apparatus and producing a third output signal representative thereof, and wherein said means for controlling said third hydraulic actuator is responsive to said second output signal and said third output signal to minimize any shift between said injection nozzle and the lower mold as a result of variations in said temperature of said injection apparatus.

18. A machine in accordance with claim 1 further comprising a rod, wherein said platform has a horizontal pivot axis, a first end and a second end opposite said first end, said first end of said platform being pivotally mounted on said base for rotation of said platform about said horizontal pivot axis, wherein said second hydraulic actuator causes the second end of said platform opposite said first end to move vertically to thereby rotate said platform about said horizontal pivot axis so as to move said injection nozzle vertically into and out of positive abutment with the resin inlet in the underside of said lower mold when said lower mold is supported on said die plate and said injection nozzle is positioned under said die plate by said base, wherein said injection nozzle is supported above said second end of said platform by said rod, and wherein said first detection means for producing a first output signal responsive to the pressure at which said injection nozzle contacts said lower mold positioned on said die plate comprises a stress measuring gauge mounted on said rod to determine the pressure at which said injection nozzle contacts said lower mold positioned on said die plate and to produce said first output signal responsive thereto.

* * * * *